US010690337B2

(12) United States Patent
Cotton et al.

(10) Patent No.: US 10,690,337 B2
(45) Date of Patent: Jun. 23, 2020

(54) ENERGY RECOVERY SYSTEM

(71) Applicant: McMaster University, Hamilton (CA)

(72) Inventors: James Cotton, Burlington (CA); Rafat Hirmiz, Oakville (CA); Jeffrey Girad, Hamilton (CA); Hossam Sadek, Hamilton (CA); Yakoob Hana, Mississauga (CA); Edward Corbin Bruce, Newmarket (CA); Michael Cino, Hamilton (CA)

(73) Assignee: McMaster University, Hamilton (CA)

( * ) Notice: Subject to any disclaimer, the term of this patent is extended or adjusted under 35 U.S.C. 154(b) by 84 days.

(21) Appl. No.: 16/124,543

(22) Filed: Sep. 7, 2018

(65) Prior Publication Data

US 2019/0137095 A1 May 9, 2019

Related U.S. Application Data

(63) Continuation of application No. 14/791,980, filed on Jul. 6, 2015, now Pat. No. 10,094,553.

(60) Provisional application No. 62/021,036, filed on Jul. 4, 2014, provisional application No. 62/021,034, filed on Jul. 4, 2014.

(51) Int. Cl.
*F22B 1/18* (2006.01)
*F24C 13/00* (2006.01)

(52) U.S. Cl.
CPC ............... *F22B 1/18* (2013.01); *F24C 13/00* (2013.01); *Y02E 20/12* (2013.01)

(58) Field of Classification Search
CPC ............. F22B 1/18; F24C 13/00; Y02E 20/12
See application file for complete search history.

(56) References Cited

U.S. PATENT DOCUMENTS 7,935,882 B2    5/2011   Pickard
2007/0221205 A1   9/2007   Landon

*Primary Examiner* — Alfred Basichas
(74) *Attorney, Agent, or Firm* — Bereskin & Parr LLP/S.E.N.C.R.L., s.r.l.

(57) ABSTRACT

This disclosure relates to the field of energy recovery systems, and more particularly to exhaust heat recovery devices and exhaust flow control devices.

20 Claims, 15 Drawing Sheets

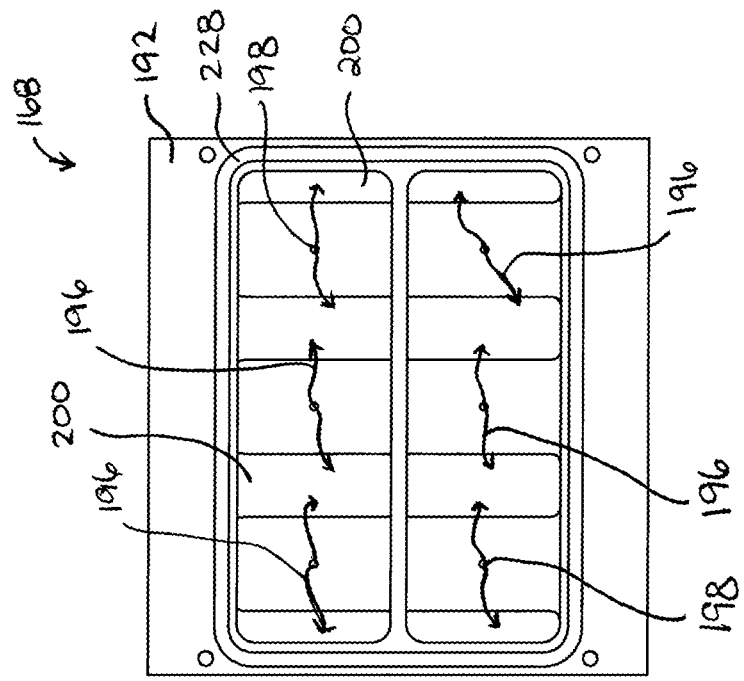
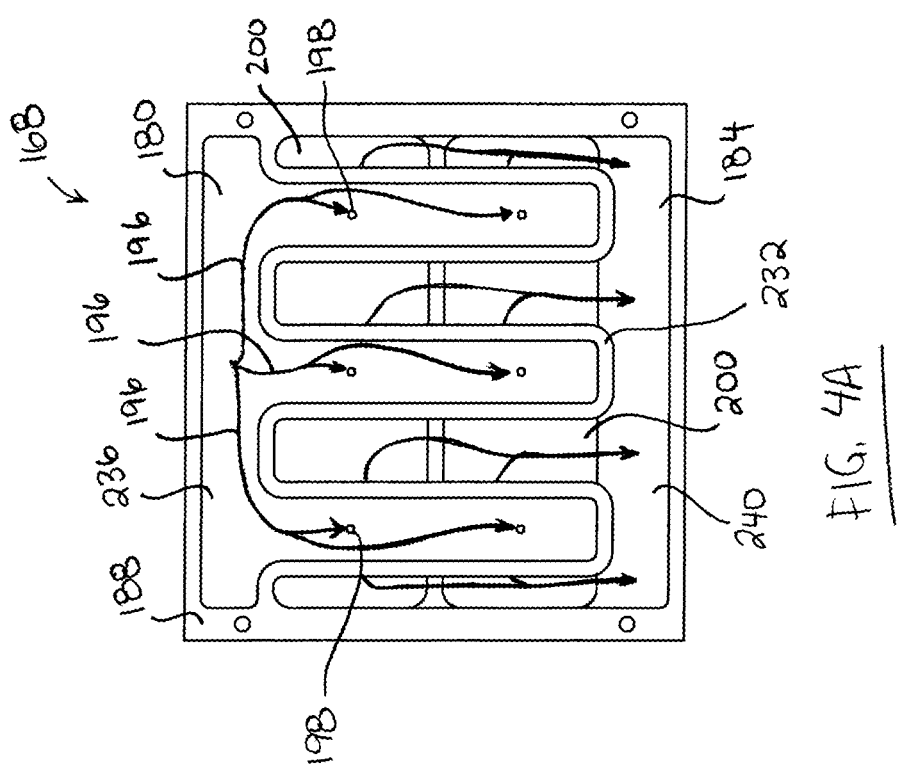

ENERGY RECOVERY SYSTEM

CROSS-REFERENCE TO RELATED APPLICATIONS

The present application is a continuation of U.S. patent application Ser. No. 14/791,980 filed Jul. 6, 2015, which claims the benefit from U.S. Provisional Patent Application No. 62/021,036, filed Jul. 4, 2014 and U.S. Provisional Patent Application No. 62/021,034, filed Jul. 4, 2014, the contents of each of which are incorporated herein by reference.

FIELD

This disclosure relates to the field of energy recovery systems, and more particularly to exhaust heat recovery devices and exhaust flow control devices.

INTRODUCTION

Naturally ventilated ovens are commonly used in the food industry, such as for baking processes (e.g. for pizza). At a restaurant, the commercial size natural gas ovens may cumulatively consume up to 50 cubic meters (or more) of natural gas each day, which may tally to an annual cost of $6,000 in natural gas at today's rates. Up to 90% (or more) of the heat developed in the oven may be lost as waste heat.

DRAWINGS

FIG. 4A is a front view of a fluid track showing the fluid track cold side, in accordance with at least one embodiment;

FIG. 4B is a rear view of the fluid track of FIG. 4A showing the fluid track hot side, in accordance with at least one embodiment;

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

Figure 1:
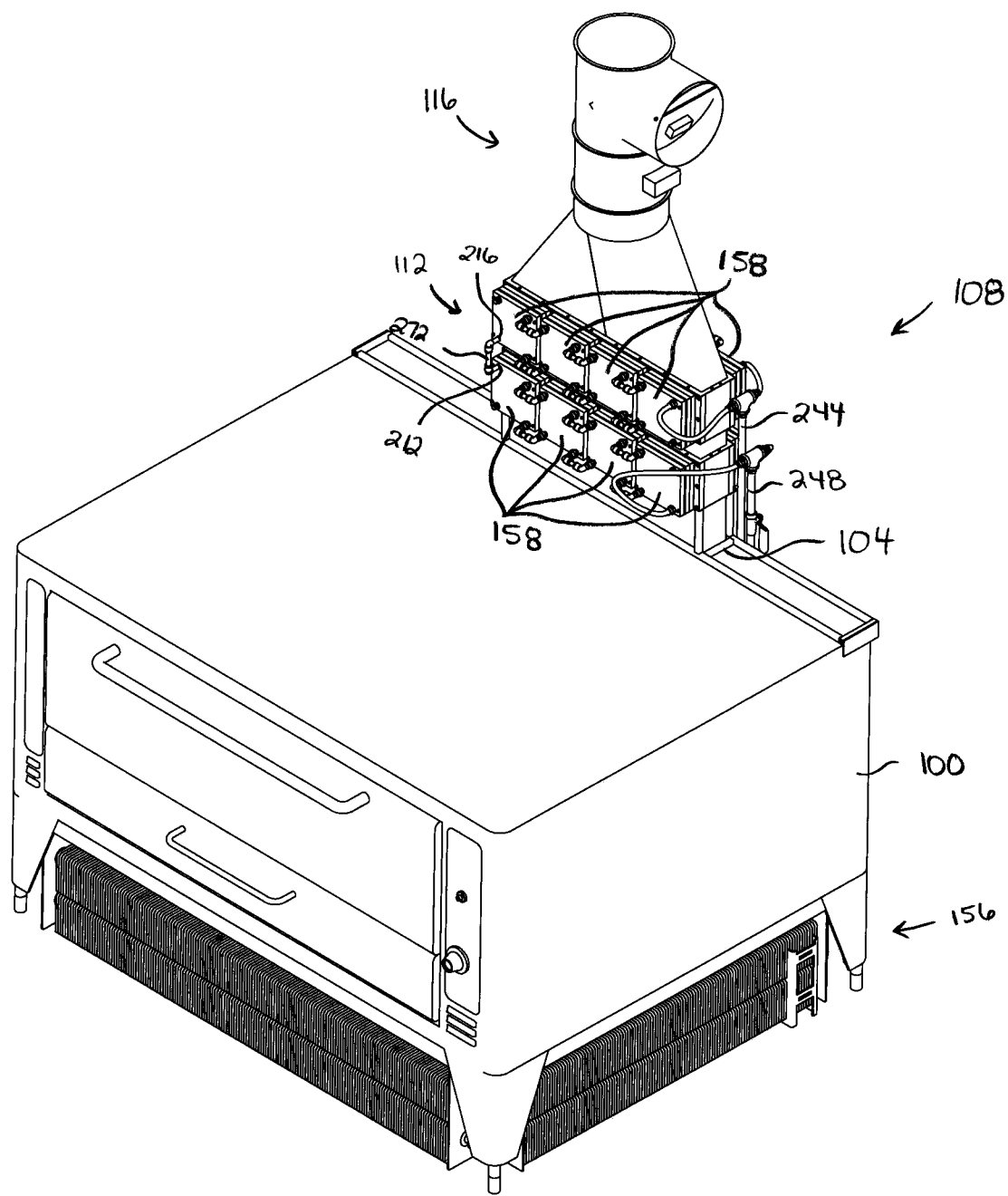
FIG. 1 is a perspective view of an oven fitted with an energy recovery system, in accordance with at least one embodiment.

Reference is first made to FIG. 1, which shows an oven 100 having an oven exhaust outlet 104 fitted with an energy recovery system 108. For example, energy recovery system 108 may form at least a portion of an outlet conduit for hot oven exhaust gases discharged from oven 100, or at least a portion of energy recovery system 108 may be positioned in an outlet conduit (e.g. chimney) for the hot oven exhaust gases.

Energy Recovery System

As shown, energy recovery system 108 may include one or both of an exhaust heat recovery device 112 and an exhaust flow control device 116. Exhaust heat recovery device 112 may be positioned in the airflow path of hot oven exhaust gases discharged from exhaust outlet 104 for capturing thermal energy for generating electricity, heating potable water, heating and/or cooling HVAC air, and/or an oven air pre-heater. Exhaust flow control device 116 may also be positioned in the airflow path of the hot oven exhaust gases discharged from exhaust outlet 104 to regulate the flow rate of the hot oven exhaust gases to atmosphere. For example, exhaust flow control device 116 may be positioned downstream of exhaust heat recovery device 112. Alternatively, exhaust flow control device 116 may be positioned upstream of exhaust heat recovery device 112.

Each of exhaust heat recovery device 112 and exhaust flow control device 116 may help improve the energy efficiency of oven 100. This may permit oven exhaust system 108 to recover energy otherwise wasted as hot gas exhausted to atmosphere, and/or to reduce the energy consumption of oven 100. System 108 is described herein as applied to an oven 100. However, it will be appreciated that system 108 may be more broadly applied to other apparatus with exhaust hot gas, such as furnaces or other heating appliances Reference is now made to FIG. 2, which shows a schematic of energy recovery system 108. As shown, energy recovery system 108 may include exhaust heat recovery device 112 positioned upstream of an exhaust flow control device 116. Exhaust heat recovery device 112 may include a heat exchanger 120, a thermoelectric generator 124, and a coolant circuit 128. Any suitable coolant, such as water, glycol, or a mixture of both, may flow in coolant circuit 128. Hot exhaust gases 132 may discharge from oven 100 across a hot side 136 of heat exchanger 120 then across exhaust flow control device 116 toward atmosphere. The exhaust flow control device 116 may control the mass flow rate of exhaust gases from oven 100 to influence the temperature and flow rate of exhaust gases 132 across hot side 136 of heat exchanger 120. As described in more detail below, exhaust flow control device 116 may include one or more valves for restricting the passage of exhaust gases 132 and/or for cooling the exhaust gases 132 by introducing colder air, called draft air from the exterior of the exhaust conduit, such as conditioned building air.

As shown, heat exchanger 120 may transfer heat from the hot exhaust gases 132 at hot side 136 across thermoelectric generator 124 to a coolant circuit 128 at cold side 140. Thermoelectric generator 124 may generate electricity in response to the temperature gradient across the thermoelectric generator 124. Any suitable maximum power point tracker hardware 162 may be integrated to maximize the generated electricity and any suitable voltage converter 162 may converter the maximum power voltage to any suitable output voltage. The generated electricity may power a pump 144 that circulates coolant 146 in coolant circuit 128. This may permit exhaust heat recovery device 112 to operate self-sufficiently off-grid, without municipal power. Alternatively, or in addition, the generated electricity may power any other suitable electrical load via a standalone (off-grid) direct current (DC) microgrid, such as control devices or sensors for system 108, lights, televisions, or signage for example. Optionally, the generated electricity may be stored in electrical storage 166 (e.g. batteries). This may permit exhaust heat recovery device 112, or energy recovery system 108 more broadly, to operate during power outages.

In some embodiments, pump 144 may circulate coolant 146 in coolant circuit 128 from cold side 140, where the coolant 146 is heated, to a sensible thermal storage 148. Sensible thermal storage 148 may be any mass of substance suitable for storing heat by variation in temperature. For example, sensible thermal storage 148 may be a tank of potable hot water for the building. Coolant circuit 128 may transfer heat to sensible thermal storage 148 by any suitable heat exchanger (e.g. a double walled heat exchanger) to raise the temperature of the sensible thermal storage 148. In alternative embodiments, coolant circuit 128 may not deliver heat to a sensible thermal storage 148.

In some embodiments, pump 144 may circulate coolant 146 in coolant circuit 128 to a latent thermal storage 152. Latent thermal storage 152 may be any suitable mass of substance suitable for storing heat as latent heat of fusion. For example, latent thermal storage 152 may be a tank of phase change material having any suitable melting point (e.g. between 60° and 120° Celsius). The phase change material may be any suitable phase change material such as organic fatty acids, paraffines, and hydrated salts. Coolant circuit 128 may transfer heat to latent thermal storage 152 by a suitable heat exchanger while the temperature of latent thermal storage 152 remains constant. This may permit latent thermal storage 152 to provide a constant temperature heat source for thermal loads, such HVAC air and combustion air preheating. For example, latent thermal storage 152 may transfer heat to HVAC air by a suitable heat exchanger for raising the temperature of the HVAC air (e.g. for warming the interior of the building). In alternative embodiments, coolant circuit 128 may not deliver heat to a latent thermal storage 152.

In some embodiments, pump 144 may circulate coolant in coolant circuit 128 to an oven air pre-heater 156. Oven air pre-heater 156 may transfer heat by a suitable heat exchanger to air entering oven 100. This may provide warmer air to the oven 100, which may reduce the fuel consumption required to raise and hold oven 100 at a set temperature. In alternative embodiments, coolant circuit 128 may not deliver heat to an oven air pre-heater 156.

Figure 14:
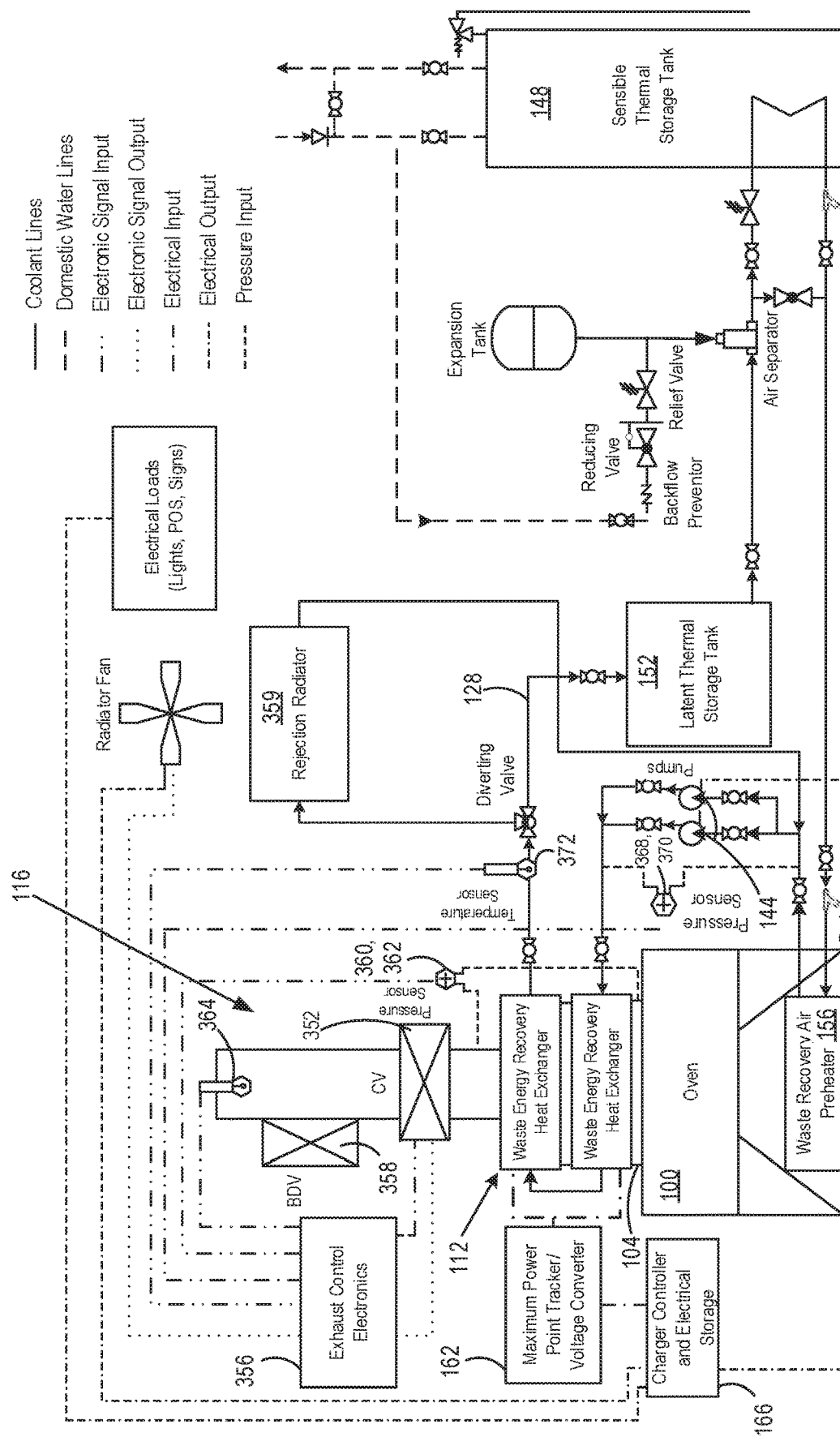
FIG. 14 is a schematic illustrating an oven fitted with an energy recovery system, in accordance with at least one embodiment.
Figure 15:
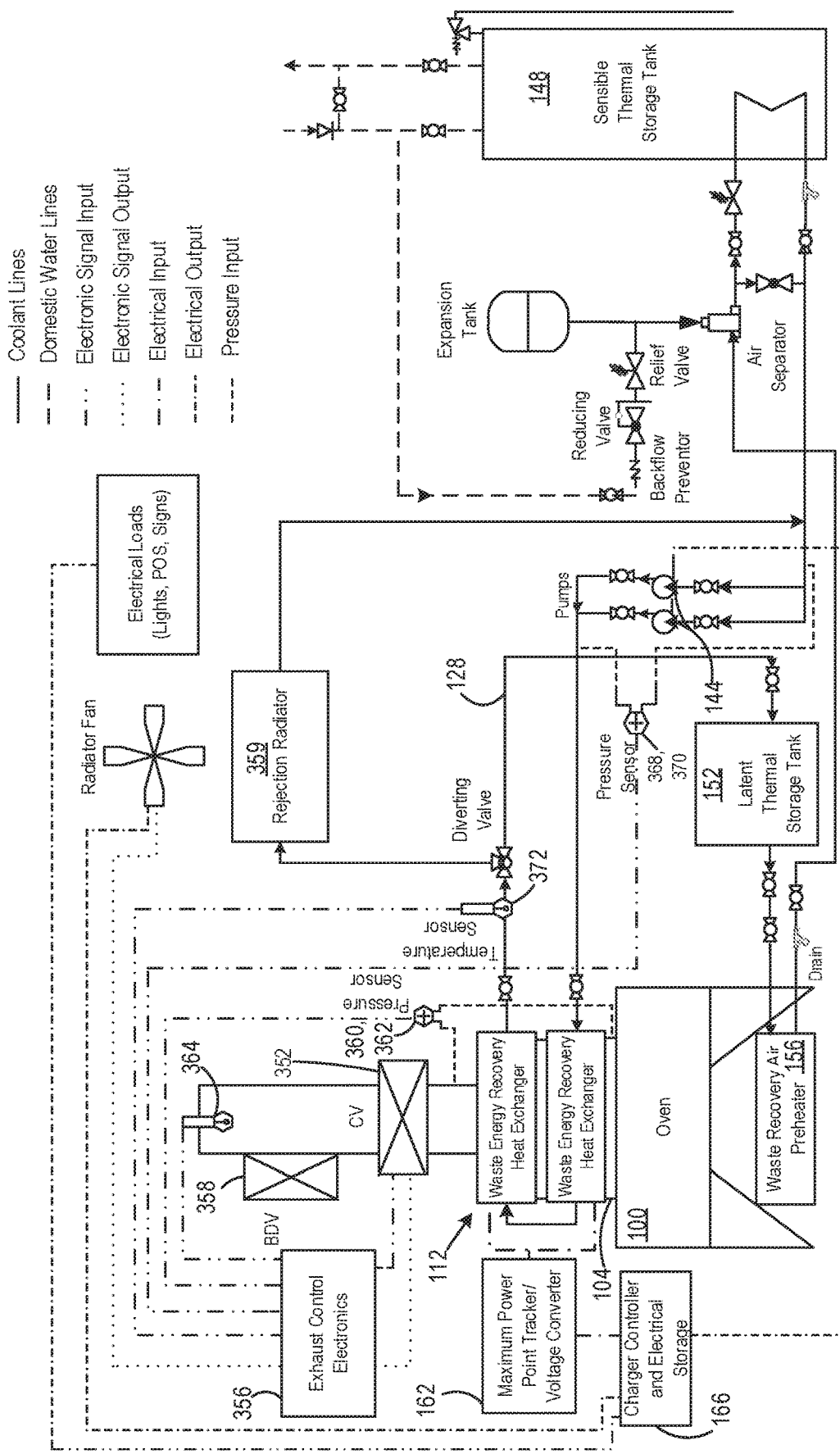
FIG. 15 is a schematic illustrating an oven fitted with an energy recovery system, in accordance with another embodiment.

As shown in FIG. 14 and FIG. 15, pump 144 may be monitored for malfunctions and preventative maintenance/failure prediction by measuring the absolute and differential head pressure at pressure sensor 368 and 370. Malfunctions may be identified by monitoring the head pressure within a prescribed pressure range designated by operating range of the heat recovery device, or a heat load drawing heat from the coolant. Preventative maintenance and failure prediction may be diagnosed by identifying anomalies in the dynamic head pressure profile.

It will be appreciated that coolant circuit 128 may direct hot coolant through the various heat loads (e.g. latent thermal storage 152, sensible thermal storage 148, and oven air pre-heater 156) in any suitable order, whether in parallel or in series. When heat loads are arranged in series with respect to the coolant circuit 128, the coolant may be of higher temperature when interacting with the upstream heat load than when interacting with the downstream heat load. Accordingly, the heat loads may be organized with respect to coolant circuit 128 according to priority and/or operating specifications of that heat load. FIG. 14 depicts an example where coolant circuit 128 circulates coolant from exhaust heat recovery device 112 downstream to latent thermal storage 152, sensible thermal storage 148, and finally oven air pre-heater 156, in that order, before returning to exhaust heat recovery device 112. FIG. 15 depicts a different example where coolant circuit 128 circulates coolant from exhaust heat recovery device 112 downstream to latent thermal storage 152, oven air pre-heater 156, and finally sensible thermal storage 148, in that order, before returning to exhaust heat recovery device 112.

It will be appreciated that one coolant circuit 128 may flow through a plurality of exhaust heat recovery devices 112, each of which may draw heat from a different source of hot exhaust gases (e.g. different ovens 100).

Exhaust Heat Recovery Device

Figure 3:
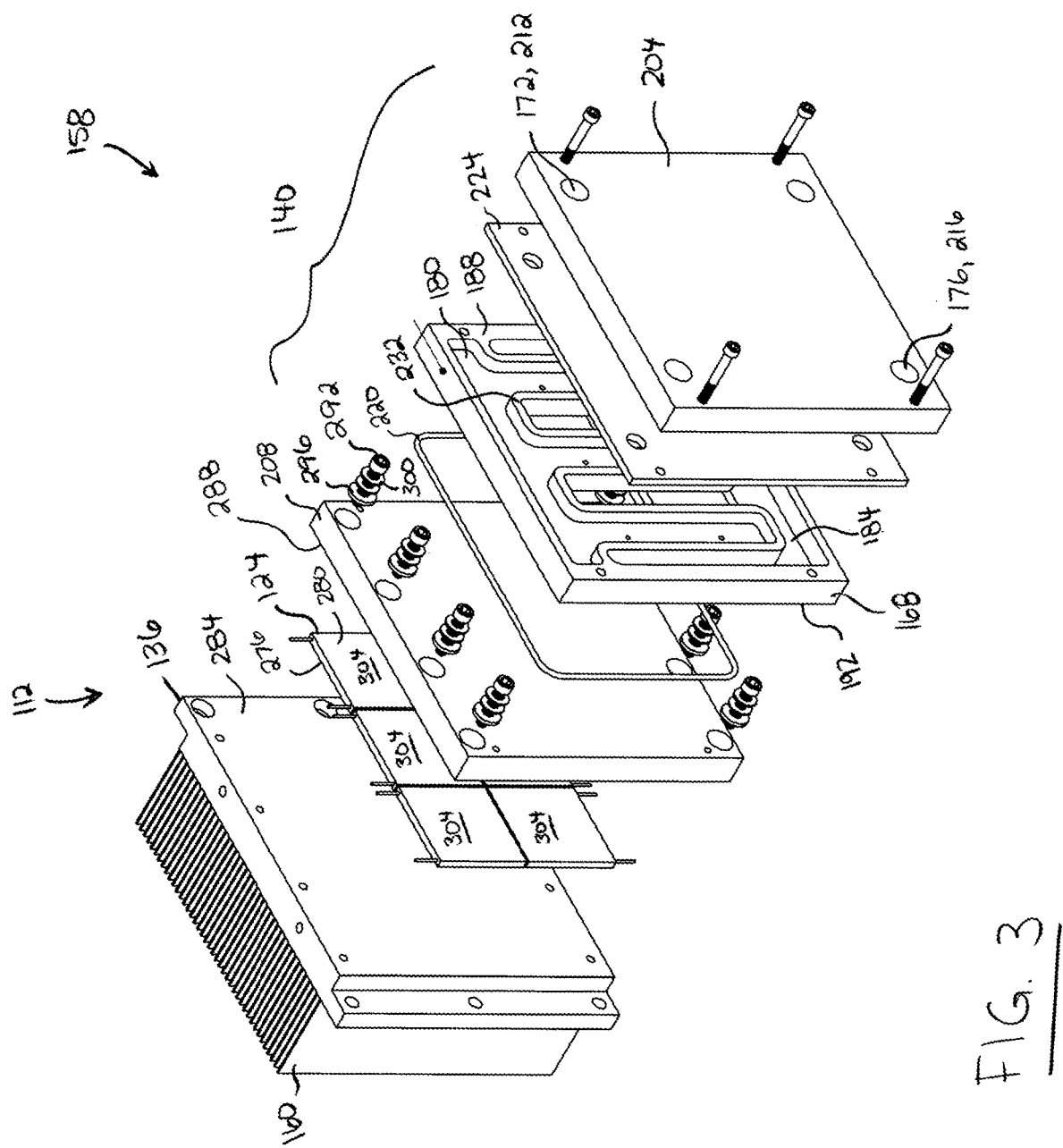
FIG. 3 is an exploded perspective view of an exhaust heat recovery module, in accordance with at least one embodiment.

Reference is now made to FIG. 3, which shows an exhaust heat recovery module 158 of an exhaust heat recovery device in accordance with at least one embodiment. As shown, exhaust heat recovery module 158 may include a heat exchanger 120 and a thermoelectric generator 124. Thermoelectric generator 124 may be positioned (e.g. sandwiched) between the hot and cold sides 136 and 140 of heat exchanger 120. This may provide a temperature gradient across thermoelectric generator 124, in response to which thermoelectric generator 124 may generate electricity.

In use, hot side 136 may be exposed to heat from hot exhaust gases. Hot side 136 may take any form suitable for drawing heat from hot exhaust gases. As exemplified, hot side 136 may include a plurality of spaced apart hot side fins 160. Fins 160 may have any suitable shape. For example, fins 160 may be plain fins (e.g. flat fins) or pin fins. This may provide hot side 136 with a large surface area of contact with the hot exhaust gases, while providing relatively little obstruction to the flow of hot exhaust gas downstream.

In use, cold side 140 may be exposed to liquid coolant for drawing heat from hot side 136 across thermoelectric generator 124. The liquid coolant may also be circulated in a circuit for carrying that heat away from heat exchanger 120 (e.g. to various heat load(s)). Cold side 140 may take any suitable form for drawing heat from hot side 136. As exemplified, cold side 140 may include a fluid track 168 defining a fluid flow path between a fluid inlet 172 and a fluid outlet 176.

Reference is now made to FIGS. 3 and 4A-4B. As exemplified, fluid track 168 may include an inlet header 180 and an outlet header 184. In use, coolant may be introduced into inlet header 180, and take one or more flow paths to outlet header 184 from which the coolant may be discharged from heat exchanger 120. Each of inlet header 180 and outlet header 184 may be defined on a cold side 188 of fluid track 168.

Referring to FIGS. 4A and 4B, inlet header 180 and outlet header 184 may be fluidly isolated except for defined flow paths 196 which extend across fluid track hot side 192. For example, fluid track 168 may define a flow path from inlet header 180 to fluid track hot side 192 and then to outlet header 184 at fluid track cold side 188. As exemplified, fluid track 168 may include one or more upstream cross-apertures 198, each defining a fluid flow path segment for fluid travelling from fluid track cold side 188 to fluid track hot side 192. Using single or multiple (array) cross-apertures 198, the cross-aperture 198 may be positioned to provide individual cooling to the thermoelectric generator 124 that may allow for improved electrical generation through uniform cooling. Fluid track 168 may also include one or more second downstream cross-apertures 200, each defining a fluid flow path segment for fluid traveling from fluid track hot side 192 to fluid track cold side 188. In operation, coolant may flow from inlet header 180 through upstream cross-apertures 198 to fluid track hot side 192, and then through downstream cross-apertures 200 to outlet header 184. Not limiting to, the cross-apertures 198 may take the form of parallel channels (micro-channels) defining a flow path between inlet header 180 to outlet header 184 across fluid track hot side 192.

Returning to FIG. 3, fluid track 168 may be sandwiched between a backing plate 204 and a clamping plate 208. In some embodiments, plates 204 and 208 may seal fluid track 168 except for one or more fluid ports. For example, backing plate 204 may include an inlet header inlet port 212 for receiving (cold) coolant into inlet header 180, and an outlet header outlet port 216 for discharging (hot) coolant from outlet header 184 (e.g. to continue along the coolant circuit).

Referring now to FIGS. 3 and 4A-4B, in some embodiments, one or more gaskets may be positioned between fluid track 168 and one or both of plates 204 and 208. In the illustrated example, an O-ring 220 is positioned between (and in contact with) clamping plate 208 and fluid track 168, and a flat gasket 224 may be positioned between (and in contact with) backing plate 204 and fluid track 168. As shown, O-ring 220 may be seated in an O-ring groove 228 formed in fluid track hot side 192. Flat gasket 224 may make contact with dividing wall(s) 232 of fluid track cold side 188 for dividing fluid track cold side 188 into an upstream portion 236 including inlet header 180, and a downstream portion 240 including outlet header 184.

Figure 2:
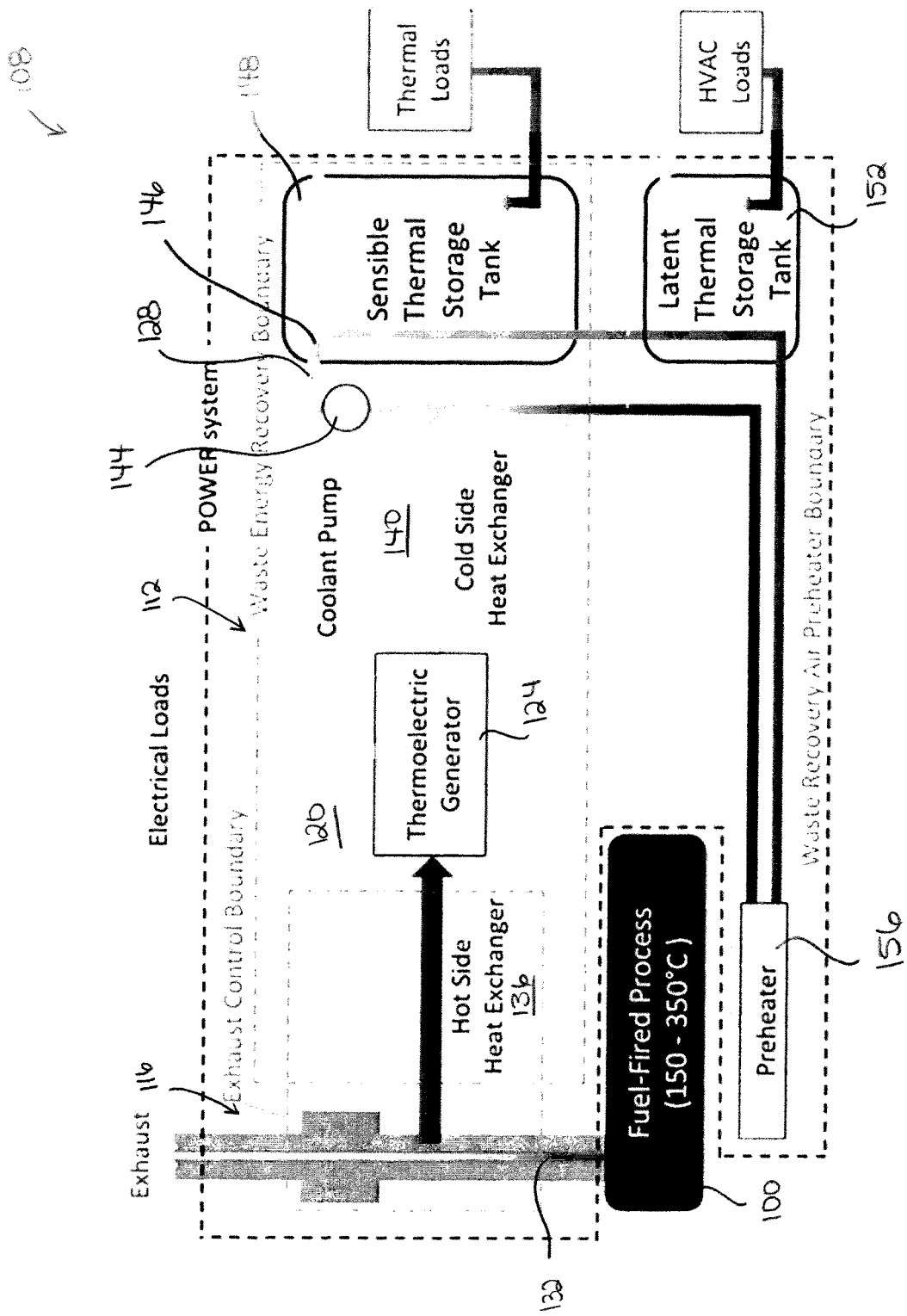
FIG. 2 is a schematic illustration of an energy recovery system, in accordance with at least one embodiment.
Figure 5:
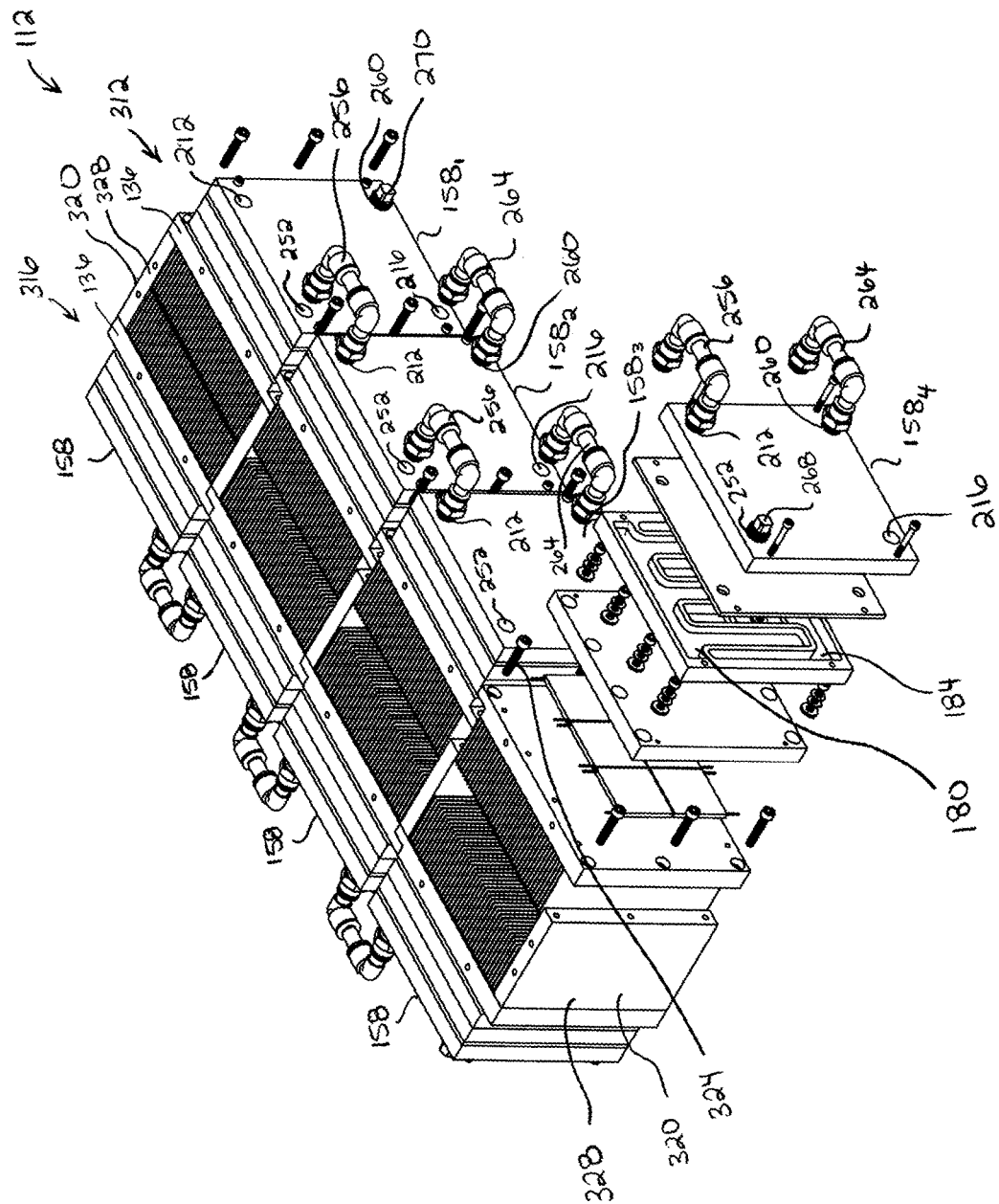
FIG. 5 is a partially exploded perspective view of an exhaust heat recovery device, in accordance with at least one embodiment.

Reference is now made to FIGS. 2 and 5. Exhaust heat recovery device 112 may include one or more exhaust heat recovery modules 158 (e.g. 1 to 100 exhaust heat recovery modules 158). In the illustrated embodiment, exhaust heat recovery device 112 includes four exhaust heat recovery modules 158. As shown, exhaust heat recovery modules 158 may be connected in parallel and/or in series to collectively define a flow segment for coolant circuit 128. FIG. 1 illustrates an example where a coolant feed line 244 delivers coolant to a bank of sixteen exhaust heat recovery modules 158, and a coolant return line 248 collects coolant which has collectively circulated through all sixteen exhaust heat recovery modules 158.

Returning to FIG. 5, the fluid track 168 of a plurality of exhaust heat recovery modules 158 may be connected in series. For example, the inlet header 180 of each exhaust heat recovery module 158 in the plurality may be fluidly connected in series, and the outlet header 184 of each exhaust heat recovery module 158 in the plurality may be fluidly connected in series. Within each exhaust heat recovery module 158, coolant may flow from the inlet header 180 to the outlet header 184 of that module 158 in parallel with the other modules 158.

Inlet headers 180 of a plurality of exhaust heat recovery modules 158 may be connected in series in any suitable manner. As exemplified, an exhaust heat recovery module 158 may include an inlet header outlet port 252 which is fluidly connected (e.g. by an inlet header conduit 256) to the inlet header inlet port 212 of a downstream exhaust heat recovery module 158. This may permit cold coolant received in an inlet header 180 through an inlet header inlet port 212 of an upstream exhaust heat recovery module 158 to flow through inlet header outlet port 252 of that exhaust heat recovery module 158 to the inlet header 180 of a downstream exhaust heat recovery module 158. The inlet header 180 of two or more exhaust heat recovery modules 158 may be connected in series in this manner. In the illustrated embodiment, the inlet headers 180 of four exhaust heat recovery modules 158 are connected in series in this manner.

Alternatively, or in addition, outlet headers 184 of a plurality of exhaust heat recovery modules 158 may be connected in series in any suitable manner. As exemplified, an exhaust heat recovery module 158 may include an outlet header inlet port 260 which is fluidly connected (e.g. by an outlet header conduit 264) to the outlet header outlet port 216 of an upstream exhaust heat recovery module 158. This may permit hot coolant expelled from an outlet header 184 through an outlet header outlet port 216 of an upstream exhaust heat recovery module 158 to flow through the outlet header inlet port 260 of a downstream exhaust heat recovery module 158 into the outlet header 184 of that downstream module 158.

Continuing to refer to FIG. 5, the illustrated embodiment depicts four exhaust heat recovery modules $158_1$, $158_2$, $158_3$, and $158_4$ having inlet headers 180 connected in series, and having outlet headers 184 connected in series. As shown, exhaust heat recovery module $158_1$ may receive cold coolant from a coolant feed line. At least a portion of the cold coolant received into the inlet header 180 of that exhaust heat recovery module $158_1$ may sequentially feed the inlet headers 180 of downstream exhaust heat recovery modules $158_2$, $158_3$, and $158_4$ by way of inlet header conduits 256. As shown, exhaust heat recovery module $158_4$ may have an inlet header plug 268 that closes its inlet header outlet port 252 to terminate the chain of series connected inlet headers 180. Alternatively, exhaust heat recovery module $158_4$ may not have an inlet header outlet port 252.

In each exhaust heat recovery module 158, coolant may flow from the inlet header 180 to the outlet header 184 in parallel with each other exhaust heat recovery module 158. As shown, coolant in the outlet header 184 of exhaust heat recovery module $158_1$ may sequentially feed into the outlet header 184 of exhaust heat recovery modules $158_2$, $158_3$, and $158_4$. The outlet header outlet port 216 of exhaust heat recovery module $158_4$ may discharge coolant to a coolant return line. Alternatively the outlet header outlet port 216 of an exhaust heat recovery module 158 may discharge coolant to an inlet header 180 of another exhaust heat recovery module 158. For example, FIG. 1 depicts an example where a crossover conduit 272 fluidly connects an outlet header outlet port 216 of one exhaust heat recovery module 158 to the inlet header inlet port 212 of another exhaust heat recovery module 158.

Returning to FIG. 5, exhaust heat recovery module $158_1$ may have an outlet header plug 270 that closes its outlet header outlet port 216 to terminate the chain of series connected outlet headers 184. Alternatively, exhaust heat recovery module $158_4$ may not have an outlet header inlet port 260.

Reference is now made to FIG. 3. Thermoelectric generator 124 may be positioned between heat exchanger hot side 136 and heat exchanger cold side 140. As shown, thermoelectric generator 124 has a hot side 276 and a cold side 280. Thermoelectric generator hot side 276 may be flush in contact with an inside face 284 of heat exchanger hot side 136, and thermoelectric generator cold side 280 may be flush in contact with an inside face 288 of heat exchanger cold side 140.

In some embodiments, thermoelectric generator 124 may be clamped between heat exchanger hot side 136 and heat exchanger cold side 140 to reduce resistance to conduction. As exemplified, one or more fasteners 292 (e.g. bolts or screws) may connect clamping plate 208 to heat exchanger hot side 136 to compress the thermoelectric generator 124 in between. Optionally, fasteners 292 may be provided with thermally insulating washers 296 to help reduce thermal bridging through fasteners 292. Alternatively, or in addition, a fastener 292 may include a resilient biasing member 300 (e.g. a spring) to help normalize the tension in the fastener 292 during thermal expansion and contraction events. This may help reduce the variation in compressive force on thermoelectric generator 124 which may help prevent damage to thermoelectric generator 124 from excessive compressive forces.

Thermoelectric generator 124 may be any suitable thermoelectric generator 124 which develops voltage in response to a temperature gradient between the hot and cold sides 276 and 280. Further, thermoelectric generator 124 may include one or more thermoelectric generator modules 304. In the illustrated embodiment, thermoelectric generator 124 includes six thermoelectric generator modules 304.

Figure 6:
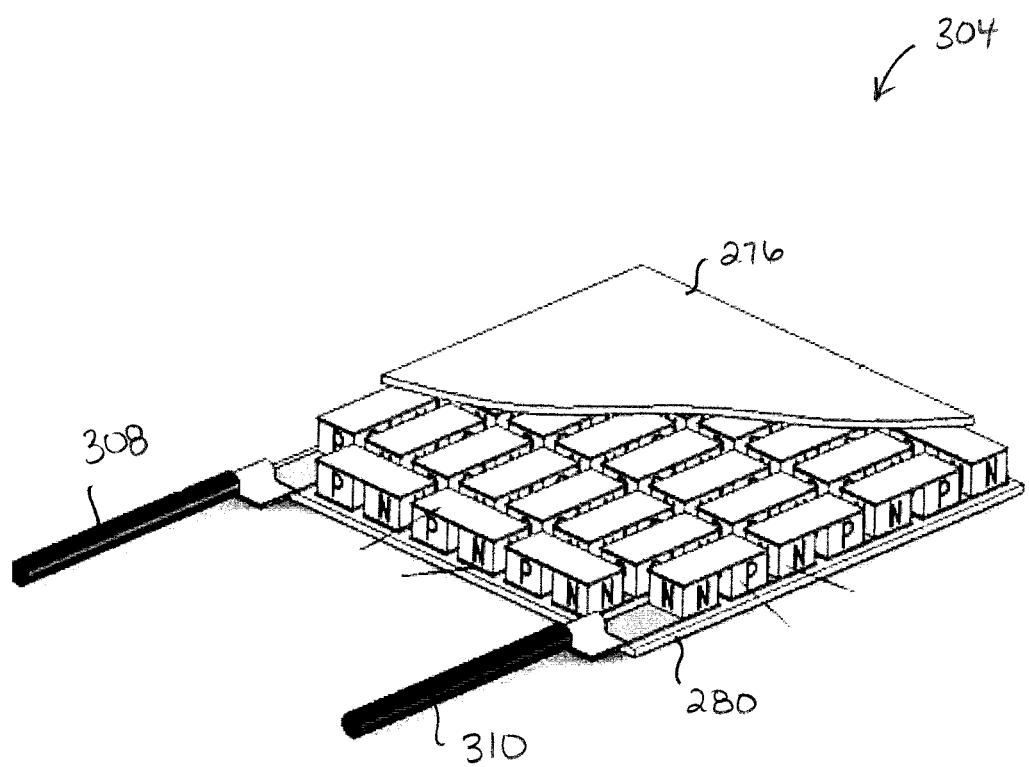
FIG. 6 is a partial cutaway perspective view of a thermoelectric generator module, in accordance with at least one embodiment.

Reference is now made to FIG. 6 which shows a thermoelectric generator module 304 in accordance with at least one embodiment. As exemplified, thermoelectric generator module 304 may be structured to develop a voltage between leads 308 and 310 proportional to a temperature gradient between the hot and cold sides 276 and 280 according to the Seebeck effect.

Thermoelectric generator modules 304 can be electrically connected in parallel and/or series to collectively supply a desired voltage for any suitable maximum power point tracking and voltage converter hardware 162. The maximum power point and stored using any suitable charge controller and battery hardware 166. For example, thermoelectric generator modules 305 can be electrically connected in series to provide the highest voltage to the maximum power point tracker and voltage converter hardware 162 to be converted to a suitable voltage to store in batteries 166 connected in parallel and/or series.

Reference is now made to FIG. 5. In some embodiments, exhaust heat recovery device 112 may include a plurality of substantially identical exhaust heat recovery modules 158. This may permit exhaust heat recovery device 112 to be sized according to the application by adding or removing exhaust heat recovery modules 158. Alternatively, or in addition, one or more exhaust heat recovery modules 158 may be substantially different from other exhaust heat recovery modules 158 of the exhaust heat recovery device 112. As exemplified, an exhaust heat recovery module 158 may be removably connected to an adjacent exhaust heat recovery module 158 to permit easy addition or removal of exhaust heat recovery modules 158. Exhaust heat recovery modules 158 may be connected in any suitable manner, such as by screws 324 or bolts for example. Alternatively, or in addition, two or more exhaust heat recovery modules 158 may be permanently connected, such as by welds or rivets.

Exhaust heat recovery modules 158 may be positionally arranged relative to each other in any suitable configuration. For example, exhaust heat recovery device 112 may include one or more rows of exhaust heat recovery modules 158. FIG. 5 depicts an example of one row of exhaust heat recovery modules 158, and FIG. 1 depicts an example of two rows of exhaust heat recovery modules 158. Referring to FIG. 5, a row of exhaust heat recovery modules 158 may include a first plurality 312 of exhaust heat recovery modules 158 longitudinally connected side-by-side, and a second plurality 316 of exhaust heat recovery modules longitudinally connect side-by-side. As shown, the first and second pluralities 312 and 316 may be oriented in lateral facing relation. For example, the heat exchanger hot sides 136 of the first plurality 312 may face the heat exchanger hot sides 136 of the second plurality 316. This may permit the first and second pluralities 312 and 316 to interact with the same volumes of exhaust gases. For example, first and second pluralities 312 and 316 may define an enclosed airflow conduit having a downstream direction through the heat exchanger hot sides 136 of the first and second pluralities 312 and 316.

Figure 7:
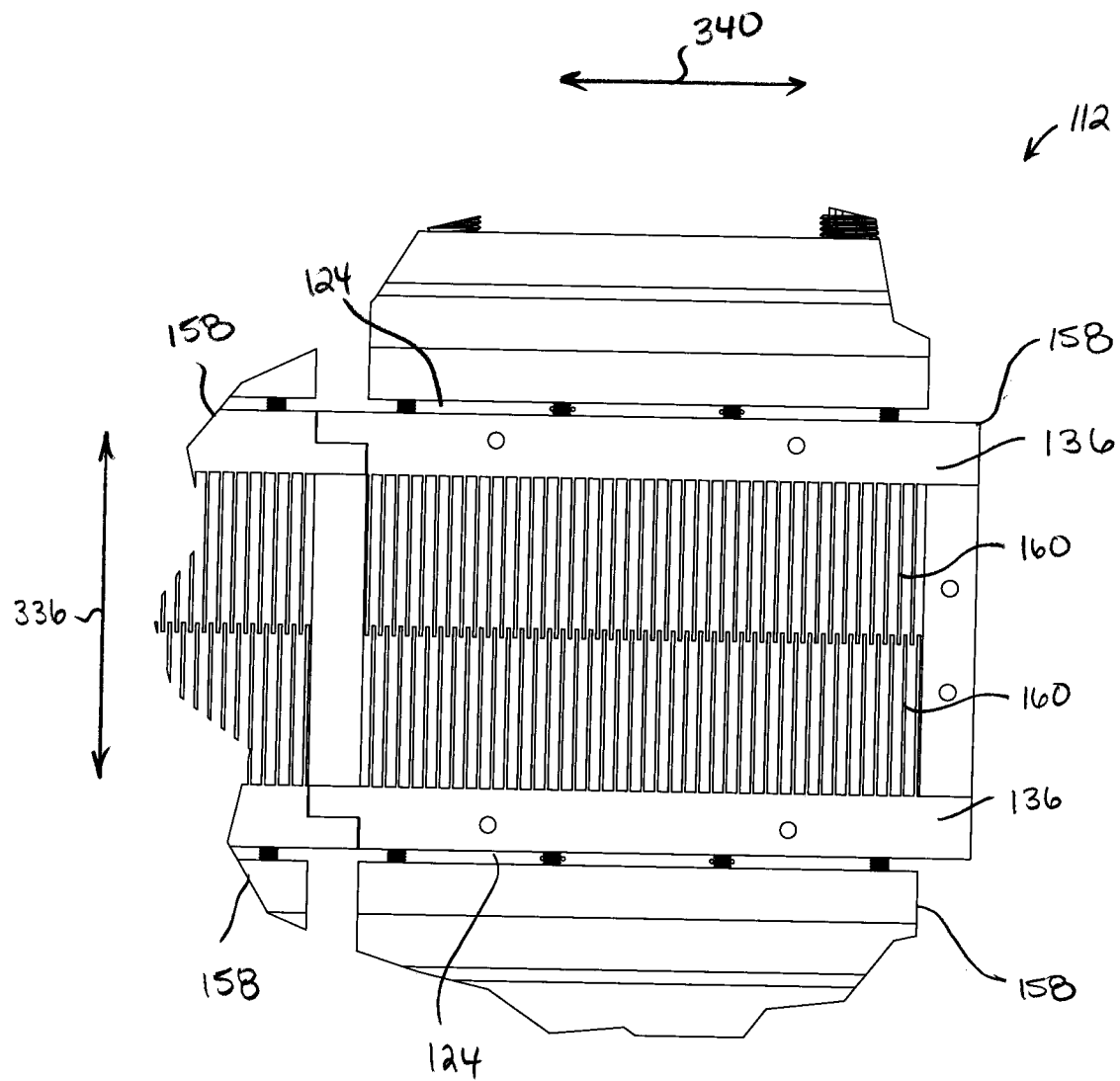
FIG. 7 is a partial view of the exhaust heat recovery device of FIG. 5.

The first and second pluralities 312 and 316 may have any suitable relative lateral positions. As shown, each longitudinal end 320 of exhaust heat recovery device 112 may include a longitudinal end plate 328 connecting the laterally opposite pluralities 312 and 316. Turning to FIG. 7, in some embodiments, the heat exchanger hot sides 136 of laterally opposed exhaust heat recovery modules 158 may laterally overlap. For example, hot side fins 160 of the laterally opposed exhaust heat recovery modules 158 may laterally overlap. This may permit hot sides 136 of laterally opposed exhaust heat recovery modules 158 to collective extend across the entire laterally distance between the modules 158. This may also permit the laterally opposite exhaust heat recovery modules 158 to accommodate thermal expansion and contraction in the lateral direction 336. In alternative embodiments, the heat exchanger hot sides 136 of laterally opposed exhaust heat recovery modules 158 may be spaced apart so as not to overlap.

Exhaust heat recovery device 112 may be configured to accommodate thermal expansion and contraction in the longitudinal direction 340. In one aspect, the assembly of exhaust heat recovery device 112 from a plurality of smaller exhaust heat recovery modules 158 may reduce shear stresses on thermoelectric generators 124 and relative motion between thermoelectric generator hot side 276 and inside face 284 heat exchanger hot side 136 and between thermoelectric generator cold side 280 and inside face 288 of the heat exchanger cold side 140 of exhaust heat recovery device 112 during longitudinal thermal expansion and contraction events. For example, during a longitudinal thermal expansion event, exhaust heat recovery device 112 may longitudinally expand by an overall longitudinal magnitude, however each longitudinally connected exhaust heat recovery module 158 may only expand by a proportional fraction of that overall longitudinal magnitude. In this way, the thermoelectric generators 124 of exhaust heat recovery modules 158 may be subjected to shear stresses corresponding to the lesser thermal expansion of their respective module 158 instead of the greater overall thermal expansion of the exhaust heat recovery device 112.

Figure 8:
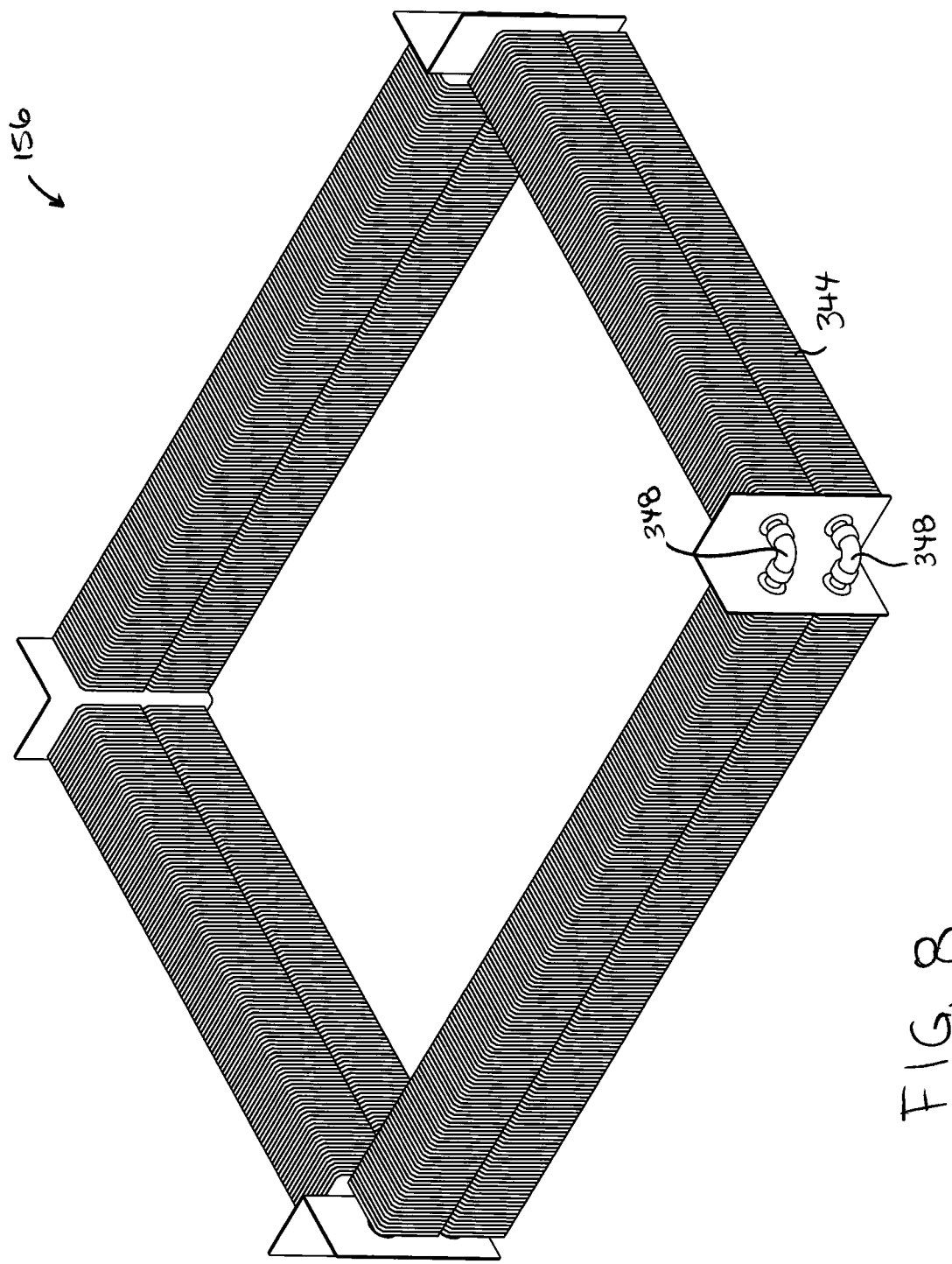
FIG. 8 is a perspective view of an oven air pre-heater, in accordance with at least one embodiment.

Reference is now made to FIGS. 1 and 8. In some embodiments, an oven air pre-heater 156 may pre-heat air entering oven 100 using hot circulating coolant. This may lessen the temperature difference between the air entering oven 100 and the set temperature (e.g. 300° C.) of the oven 100. In turn, this may reduce the fuel consumption (e.g. of natural gas) required to raise the temperature of the air entering oven 100 to the set temperature, and maintain the oven set temperature. In some embodiments, oven air pre-heater 156 may raise the temperature of air entering oven 100 from ambient temperature (e.g. 15-25° C.) to between 50-120° C. or approximately 80° C.

Oven air pre-heater 156 may be a positioned in the air flow path of air which enters oven 100. FIG. 1 depicts an example of an oven 100 which draws in air from an underside of the oven. As shown, oven air pre-heater 156 may surround the lower periphery of oven 100 in the air flow path of air entering oven 100. In the event that oven pre-heater is in line-of-sight of the combustion chamber any suitable radiation shield may be used. Hot coolant may circulate through oven air pre-heater 156 to thermally interact with the air entering oven 100. This may permit oven air pre-heater 156 to raise the temperature of the air entering oven 100.

Reference is now made to FIG. 8. Oven air pre-heater 156 may be any suitable liquid-gas heat exchanger. As exemplified, oven air pre-heater 156 may include a plurality of fins 344, and one or more fluid conduits 348 extending through the fins 344. Air may pass between fins 344 across fluid conduits 348 to receive heat from coolant circulating through fluid conduits 348. Oven air pre-heater 156 may have any suitable shape and size. FIG. 8 depicts an example of an oven air pre-heater 156 having four sides arranged in a rectangular shape.

Exhaust Flow Control Device

The flow within a naturally ventilated exhaust system may be driven by a pressure differential, sometimes referred to as "draft". The pressure differential may be caused by a buoyancy-driven phenomenon sometimes referred to as the "stack effect". Draft may be a function of temperature difference between the hot exhaust gases and the exterior air, as well as localized pressure gradients that may develop around the exhaust system due to wind or other factors.

In some cases, a naturally ventilated appliance may employ a draft hood to permit cold air to enter the exhaust conduit of the appliance. This may help reduce fluctuations in air pressure at the appliance. For example, the draft hood may provide a lower resistance path for air to enter the exhaust system, so that an excess or shortfall in draft draws more or less air preferentially from the draft hood instead of from the appliance. Further, cold air that enters the exhaust system by way of the draft hood may further reduce the draft by lowering the exhaust temperature within the chimney.

Appliances having exhaust systems applying the passive draft hood approach may still experience significant fluctuations in draft. This may lead to dramatic changes in natural gas consumption between winter and summer months due to outside temperature differences, all else being equal. Further, a passive draft hood may inject an unnecessary amount of costly conditioned air from a building, which has been conditioned by air handling equipment serving the building, into the exhaust stream.

Referring to FIG. 1, energy recovery system 108 may include an exhaust flow control device 116 in combination with, or instead of, exhaust heat recovery device 112. The exhaust flow control device 116 may actively control the exhaust gas flow to maintain a more consistent and stable draft without excessive use of (costly) conditioned air. In turn, this may provide one or more of: a reduction in fuel consumption, more stable cooking environment (e.g. in the case of an oven), and more efficient combustion (e.g. where the appliance has burners).

In some embodiments, the exhaust control may operate within the parameters of a minimum mass flow through the appliance, and a maximum chimney exhaust temperature. In the case of an oven, the minimum mass flow may be the minimum mass flow of exhaust gas through the oven to support complete combustion (e.g. to avoid producing carbon monoxide gas), or the minimum mass through the exhaust outlet to satisfy fire safety regulations (e.g. of the local municipality or other regulatory entity). The maximum chimney temperature may be prescribed by the type of chimney (e.g. by the manufacturer, or a regulatory entity). For example, a B-vent chimney may be rated for a maximum exhaust gas temperature of 249° C.

Figure 9:
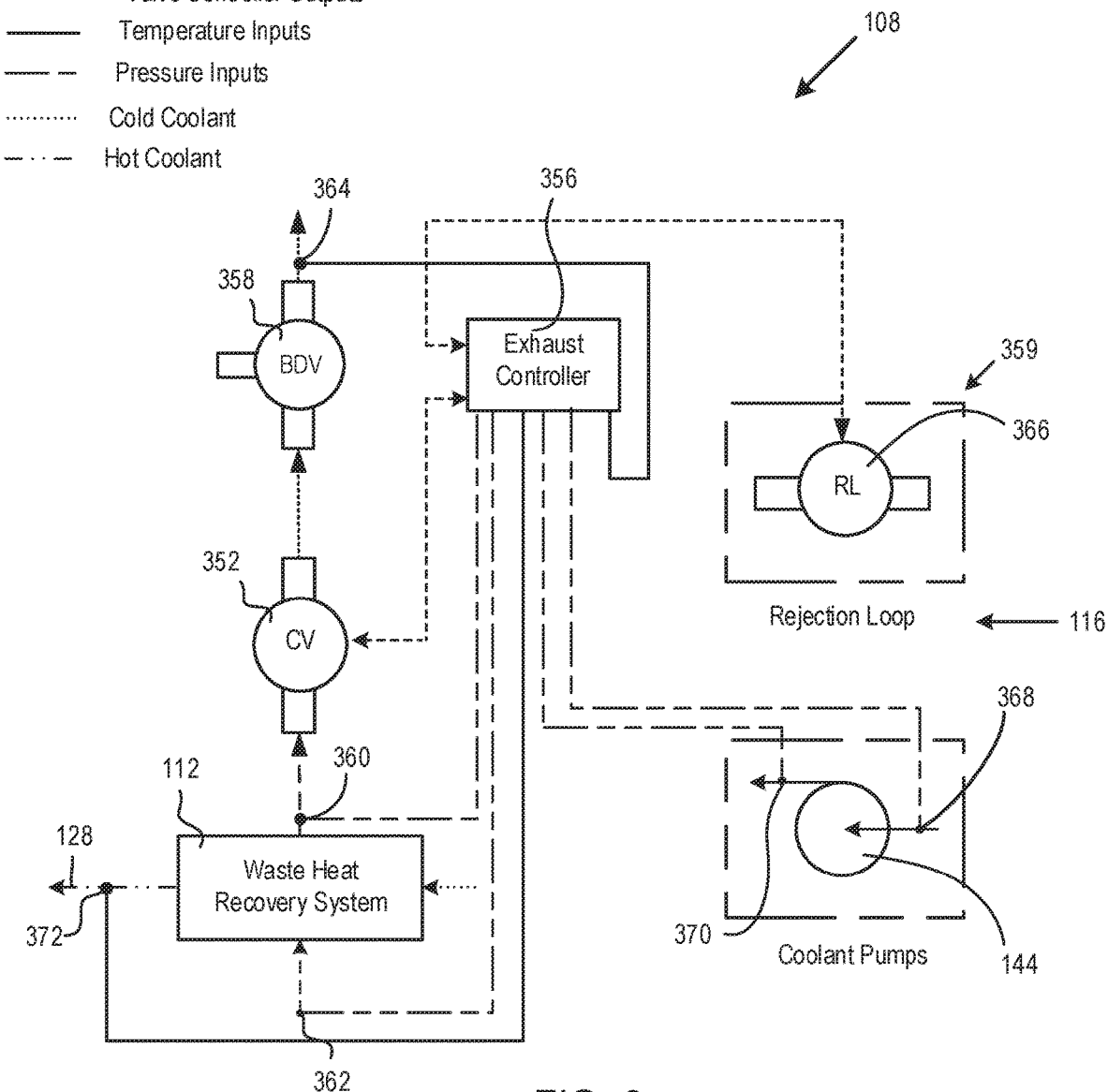
FIG. 9 is a schematic illustration of an energy recovery system, in accordance with at least one embodiment.

FIG. 9 shows a schematic of energy recovery system 108 including an exhaust heat recovery device 112 upstream of an exhaust flow control device 116. As shown, exhaust flow control device 116 may include a flow restriction valve 352 operated by an exhaust controller 356. In some embodiments, exhaust flow control device 116 may include one or both of a backdraft valve 358, and a heat rejection device 359. Exhaust controller 356 may actively operate the position of flow restriction valve 352 to satisfy one or both of the minimum mass flow and maximum chimney exhaust temperatures.

Figure 10:
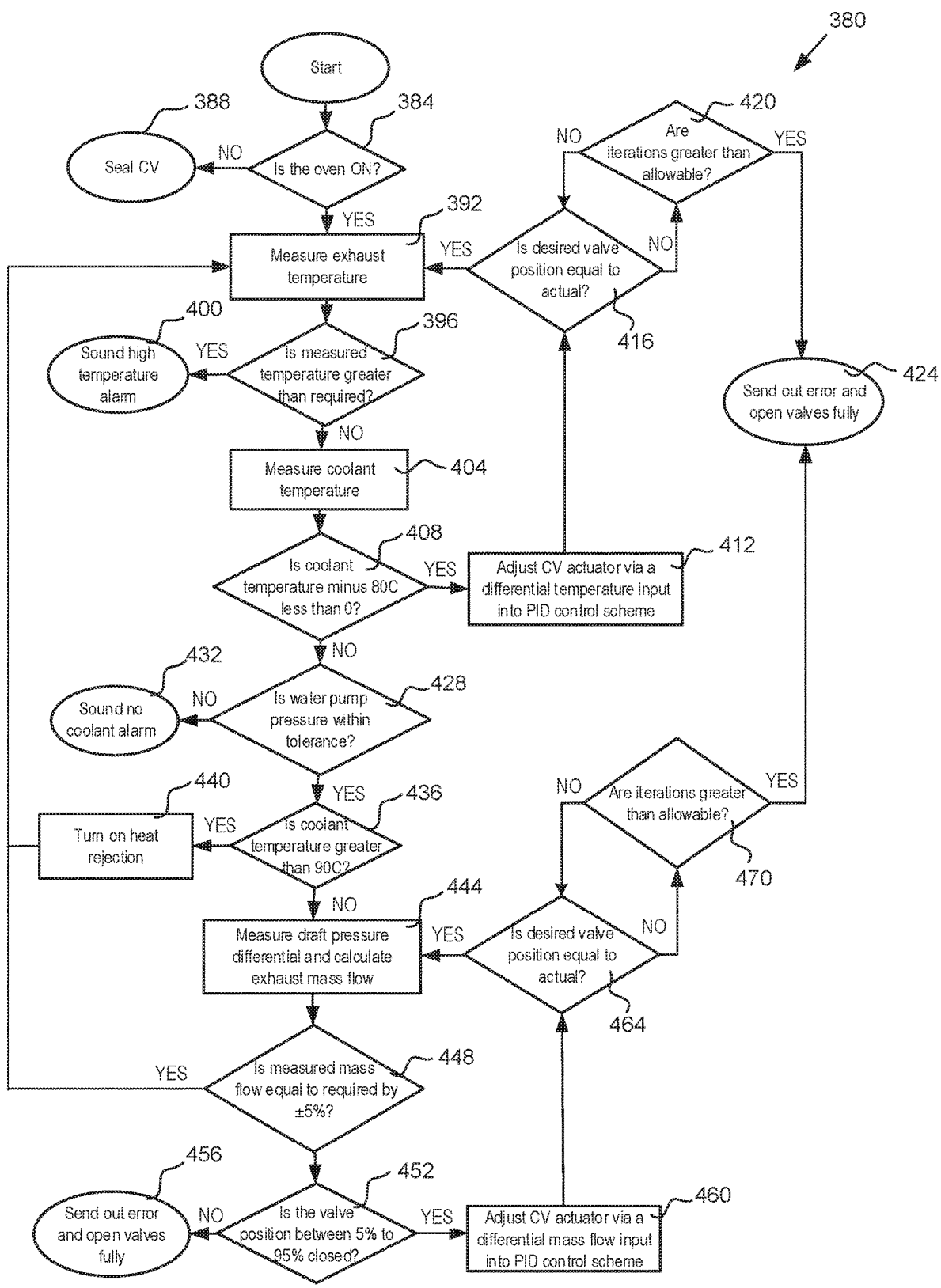
FIG. 10 is a flowchart illustrating a method of controlling an exhaust system, in accordance with at least one embodiment.

Reference is now made to FIGS. 9 and 10. FIG. 10 shows a flowchart illustrating a method 380 of controlling an exhaust system. At 384, exhaust controller 356 may assess whether the oven is turned off. If the oven is turned off and not requiring maintenance, then the exhaust controller 356 may close the flow restriction valve 352 at 388. This may prevent flow in the exhaust conduit by imposing high flow impendence via the flow restriction valve 352 to retain the hot air in the oven when the oven is turned off to maintain a higher oven temperature for when the oven is later turned on. In turn, this may help reduce the fuel consumption required to bring the oven to a set temperature.

If the oven is turned on, then the exhaust controller 356 may receive an exhaust temperature measurement at 392. For example, exhaust controller 356 may be communicatively coupled to a chimney temperature sensor 364 positioned to read the temperature of the exhaust gas in the chimney. Chimney temperature sensor 364 may be any suitable temperature sensor, such as a thermocouple positioned in the exhaust gas flow downstream of the flow restriction valve 352.

At 396, exhaust controller 356 may determine whether the exhaust temperature measured at 392 exceeds a predetermined maximum exhaust temperature (e.g. 249° C.). The predetermined maximum exhaust temperature may be the maximum exhaust temperature for the chimney. If so, then exhaust controller 356 may sound an alarm at 400 or take another remedial action at 400. If the exhaust temperature at 392 does not exceed the predetermined maximum exhaust temperature, then exhaust controller 356 may receive a coolant temperature measurement at 404. For example, exhaust controller 356 may be communicatively coupled to a coolant temperature sensor 372 positioned to read the temperature of coolant in the coolant circuit at the outlet of exhaust heat recovery device 112. Coolant temperature sensor 372 may be any suitable temperature sensor for measuring the temperature of liquids.

At 408, exhaust controller 356 may determine whether the coolant temperature measured at 404 is less than a predetermined minimum coolant temperature. The predetermined minimum coolant temperature may be a minimum temperature at which exhaust heat recovery device 112 can operate to specification. For example, the predetermined minimum coolant temperature may be between 65° C. and 120° C., such as between 75° C. and 100° C., or approximately 80° C.

If the exhaust controller 356 determines that the coolant temperature measured at 404 is less than the predetermined minimum coolant temperature, then exhaust controller 356 may operate the flow restriction valve 352 to promote a rise in the coolant temperature. For example, exhaust controller 356 may adjust the position of flow restriction valve 352 towards fully-opened to increase the mass flow of exhaust gas through exhaust heat recovery device 112. In some embodiments, exhaust controller 356 may adjust the position of flow restriction valve 352 according to a Proportional-Integral-Derivative (PID) control scheme or alternative schemes.

At 416, the exhaust controller 356 determines whether the position of flow restriction valve 352 matches the positioned set at 412 and if not, then the exhaust controller 356 makes iterative positional adjustments to the restriction valve 352 until the restriction valve position matches the position set at 412, and then the method proceeds to 392. If at 420, the exhaust controller 356 determines that the number of iterations performed exceeded a predetermined maximum number of iterations, then an error is recorded at 424. Optionally, the flow restriction valve 352 may be moved to fully open at 424 as a precaution. For example, flow restriction valve 352 may include a passive bias (e.g. spring) which acts to automatically open flow restriction valve 352 when control by exhaust controller 356 is relinquished (e.g. by choice as at 424, or by power failure or system failure for example). This may provide a fail-safe to help avoid blocking the exhaust flow through the chimney if control over flow restriction valve 352 is lost or malfunctioning.

Steps 392-416 may be repeated until exhaust controller 356 determines at 408 that the coolant temperature is equal to or greater than the predetermined minimum coolant temperature, (or an error is recorded at 424). If exhaust controller 356 determines that the coolant temperature is at least the predetermined minimum coolant temperature, then exhaust controller 356 may determine whether the coolant pumps 144 are providing within ±5%-10%, for example, of a predetermined head pressure using the upstream pressure sensor 368 and the downstream pressure sensor 370. Pressure sensors 368 and 370 may be any suitable pressure sensors for measuring liquid pressure. The basis for the coolant pump 144 head pressure may be the head pressure at which the heat recovery device, or a heat load drawing heat from the coolant, is rated or intend to operate.

If the exhaust controller 356 determines at 428 that the coolant pump head pressure is not within the predetermined head pressure range, then exhaust controller 356 may sound an alarm at 432 or take another remedial action at 432.

If exhaust controller 356 determines that the head pressure is within the predetermined head pressure range at 428, then exhaust controller 356 may determine whether the coolant temperature exceeds a predetermined maximum coolant temperature. The basis for the maximum coolant temperature may be the maximum temperature at which the exhaust heat recovery device, or a heat load drawing heat from the coolant, is rated or intended to operate. In all cases, the predetermined maximum coolant temperature is greater than the predetermined minimum coolant temperature. In some examples, the predetermined maximum coolant temperature may be between 70° C. and 120° C., such as between 80° C. and 100° C., or approximately 90° C.

If the exhaust controller 356 determines at 436 that the coolant temperature exceeds the predetermined maximum coolant temperature, then exhaust controller 356 may activate a heat rejection device 359 at 440. The heat rejection device 359 may be any suitable device for dissipating heat from coolant. For example, heat rejection device 359 may include a radiator and a fan. In this example, the coolant may circulate through the radiator, and the fan may force/circulate air across the radiator to take heat from the coolant. Exhaust controller 356 may activate a heat rejection valve 366 (e.g. solenoid valve) at 440 to divert coolant to flow through the heat rejection device 359. In alternative embodiments, heat rejection valve 366 may be a passive thermally activated diverting valve set to open when the coolant temperature exceeds the predetermined maximum coolant temperature.

If the exhaust controller 356 determines at 436 that the coolant temperature does not exceed the predetermined maximum coolant temperature, then exhaust controller 356 may measure an exhaust gas pressure differential across a calibrated element to calculate the exhaust mass flow rate.

The relationship between exhaust gas mass flow rate and pressure differential across a known element (e.g. the oven, or exhaust heat recovery device 112) may be predetermined by measuring the pressure differential (ΔP) at various mass flow rates ($\dot{m}_{exhaust}$) to determine a loss coefficient ($C_{loss}$), where:

$$\Delta P = C_{loss} \times \dot{m}_{exhaust}$$

In the illustrated example, exhaust controller 356 is communicatively coupled to a pressure sensor 362 positioned to measure the exhaust gas pressure at an upstream end of exhaust heat recovery device 112, and a pressure sensor 360 positioned to measure exhaust gas pressure at a downstream end of exhaust heat recovery device 112. Pressure sensors 360 and 362 may be any suitable pressure sensors for measuring gas pressure. Exhaust controller 356 may calculate the mass flow rate of exhaust gas based on the difference in pressure measurements from pressure sensors 360 and 362, and the predetermined relationship between the pressure difference and mass flow rate.

At 448, exhaust controller 356 may determine whether the exhaust gas mass flow rate determined at 444 is within a predetermined tolerance of a predetermined mass flow rate. The predetermined tolerance may be a narrow range, such as ±5%-10% for example. The basis for the predetermined mass flow rate may be the minimum mass flow of exhaust gas through the oven to support complete combustion (e.g. to avoid producing carbon monoxide gas), or the minimum mass flow rate through the oven exhaust outlet to satisfy fire safety regulations (e.g. of the local municipality or other regulatory entity).

If the exhaust controller 356 determines at 448 that the exhaust gas mass flow rate is not within the predetermined tolerance of the predetermined mass flow rate, then the exhaust controller 356 may verify that the flow restriction valve 352 is within the predetermined range of 5% to 95% closed, for example, to limit the flow restriction valve 352 to the manufacture specified operating limits. For example, in the event of poor draft or reverse draft the exhaust controller 356 may adjust the position of flow restriction valve 352 to fully-open and may never satisfy the predetermined mass flow rate. Conversely, in the event of a strong draft the exhaust controller 356 may adjust the position of flow restriction valve 352 to fully-close to decrease the mass flow rate of exhaust gas, but it may choke the oven 100. At 452, an event leading to an infinite loop at 444 to 470 may be stopped by the exhaust controller 356 by sounding an alarm at 456 or to take another remedial action at 456. In some embodiments exhaust controller 356 may avoid this infinite loop by limiting the number of iterations of 444 to 470.

If the exhaust controller 356 determines at 452 that the exhaust gas mass flow rate is within the predetermined range of the flow restriction valve 352, then the exhaust controller 356 may operate the flow restriction valve 352 to increase or decrease the flow restriction. For example, exhaust controller 356 may adjust the position of flow restriction valve 352 towards fully-opened to increase the mass flow rate of exhaust gas if the exhaust gas mass flow rate is less than the predetermined mass flow rate. Conversely, exhaust controller 356 may adjust the position of flow restriction valve 352 towards fully-closed to decrease the mass flow rate of exhaust gas if the exhaust gas mass flow rate is greater than the predetermined mass flow rate. In some embodiments, exhaust controller 356 may adjust the position of flow restriction valve 352 according to a PID control scheme.

At 464 and 470, the exhaust controller 356 may determine if the position of the flow restriction valve 352 matches the position set at 460, and if not, then iterate substantially as described in reference to steps 416, 420, and 424. If exhaust controller 356 determines at 464 that the position of flow restriction valve 352 matches the position set at 460, then the method returns to repeat steps 444 and 448 until exhaust controller 356 determines at 448 that the exhaust gas mass flow rate is within the predetermined tolerance of the predetermined mass flow rate. In that case, the method repeats back from 392.

Figure 11:
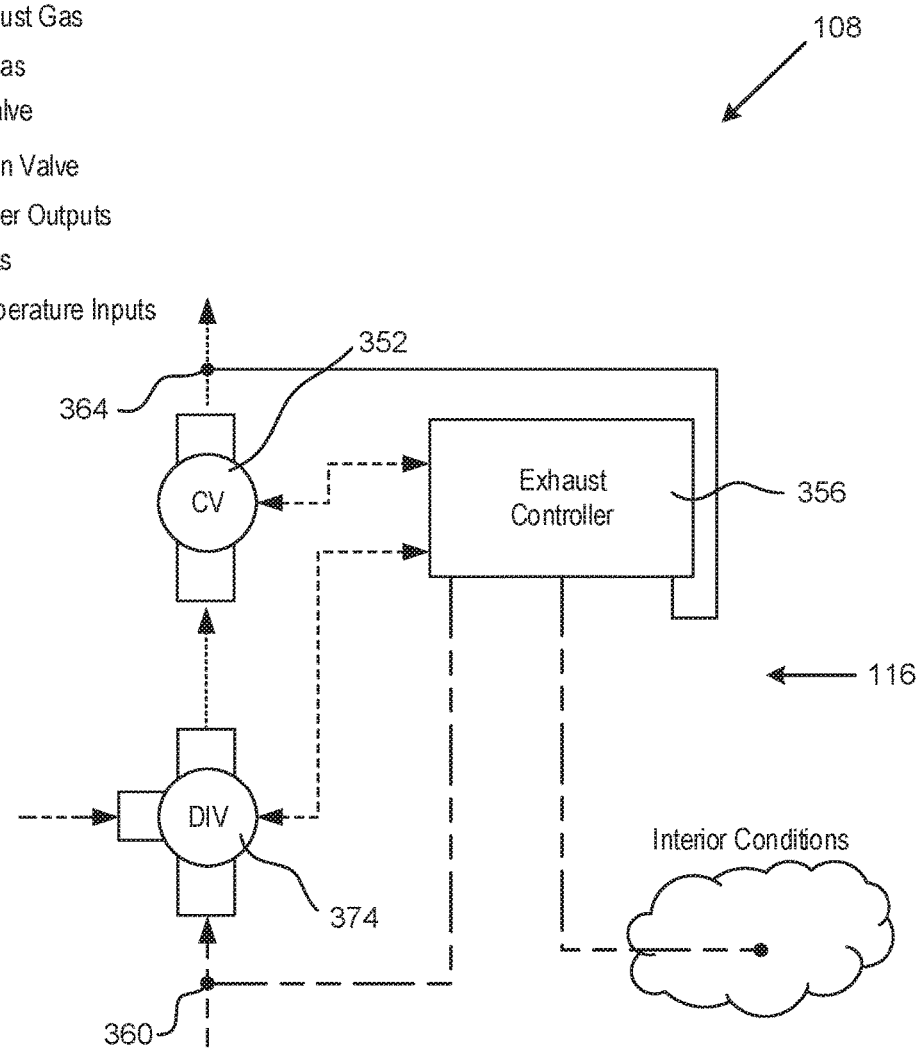
FIG. 11 is a schematic illustration of an energy recovery system, in accordance with another embodiment.

FIG. 11 shows a schematic of energy recovery system 108 including an exhaust heat recovery device 112 having an exhaust flow control device 116 in accordance with another embodiment. The embodiment of exhaust flow control device 116 shown may be particularly suitable for operating in an energy recovery system 108 absent an exhaust heat recovery device. As shown, exhaust flow control device 116 may include a flow restriction valve 352 and a draft intake valve 374 both operated by an exhaust controller 356. The flow restriction valve 352 may be operated to selectively obstruct the outflow of exhaust gas, and draft intake valve 374 may be operated to selective admit external draft air into the exhaust gas flow. Exhaust controller 356 may actively operate the loop of flow restriction valve 352 and draft intake valve 374 to satisfy one or both of the minimum mass flow and maximum chimney exhaust temperatures described above. Valves 352 and 374 may be any suitable type of valve, such as a butterfly valve.

Figure 12:
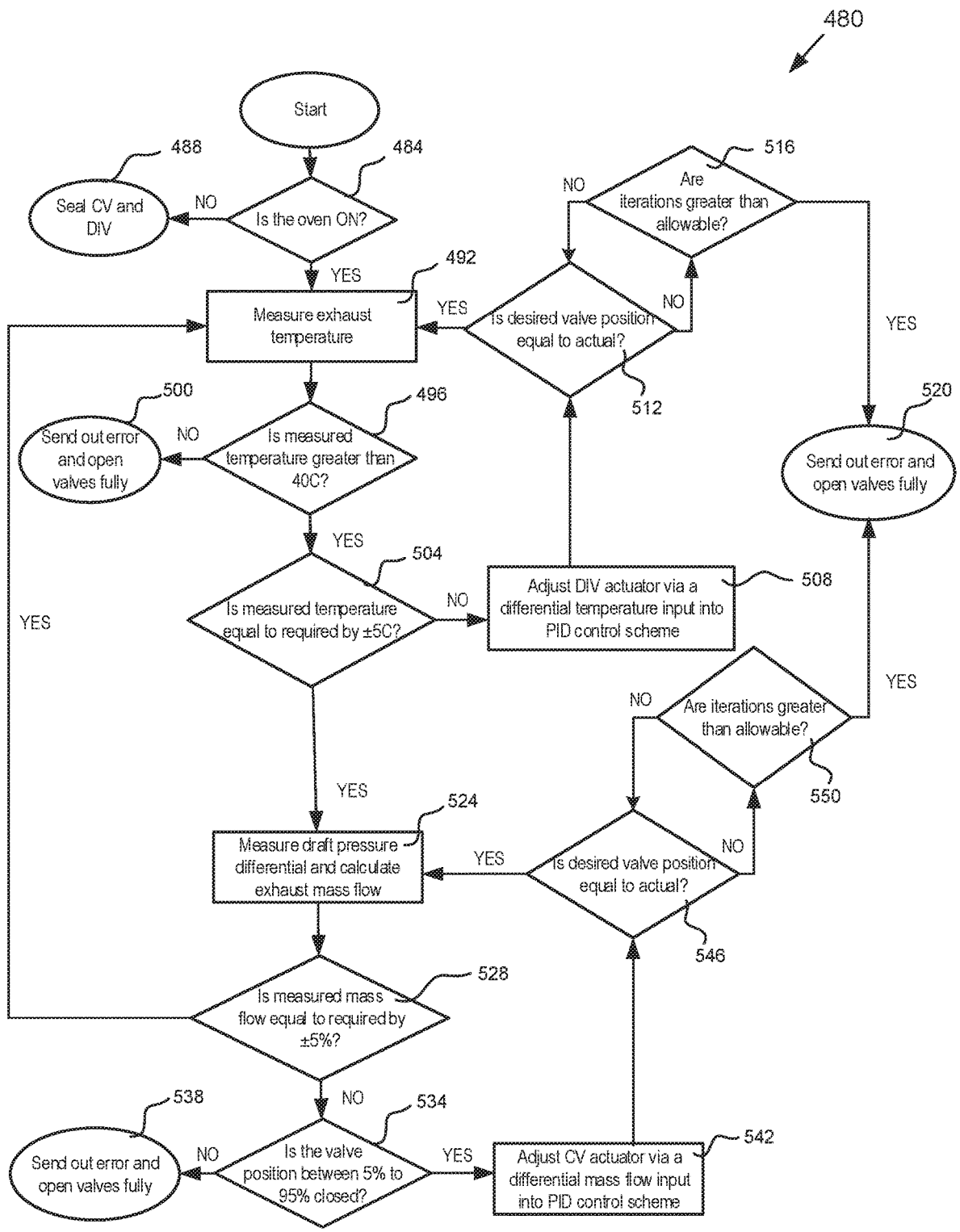
FIG. 12 is a flowchart illustrating a method of controlling an exhaust system, in accordance with another embodiment.

Reference is now made to FIGS. 11 and 12. FIG. 12 shows a flowchart illustrating a method 480 of controlling an exhaust system. At 484, exhaust controller 356 determines if the appliance (e.g. oven) is on. If the oven is turned off and not requiring maintenance, then the exhaust controller 356 may close the flow restriction valve 352 and draft intake valve 374 at 488. This may help to retain the hot air in the oven when the oven is turned off to maintain a higher oven temperature for when the oven is later turned on. In turn, this may help reduce the fuel consumption required to bring the oven to a set temperature.

If the oven is turned on, then exhaust controller 356 may measure the exhaust temperature at 492, substantially as described above with respect to step 392 of method 380.

At 496, exhaust controller 356 may determine whether the exhaust temperature measured at 492 is less than a first predetermined exhaust temperature. For example, exhaust controller 356 may receive an exhaust temperature reading from chimney temperature sensor 364. The basis for the first predetermined exhaust temperature may be to prevent backdrafts flowing back through the oven. This may occur where the temperature measured at 492 is sufficiently low. In some examples, the first predetermined exhaust temperature may be between 35° C. and 50° C., such as approximately 40° C.

If exhaust controller 356 determines at 496 that the exhaust temperature is at least the first predetermined exhaust temperature, then exhaust controller 356 may determine at 504 whether the temperature measured at 492 is within a predetermined threshold of a second predetermined temperature. The predetermined tolerance may be a narrow range, such as ±5%-10% for example. The second predetermined temperature may be a temperature less than the maximum chimney exhaust temperature and greater than the first predetermined temperature.

If exhaust controller 356 determines at 504 that the exhaust temperature is not within the predetermined threshold of the second predetermined temperature, then exhaust controller 356 may adjust the position of draft intake valve 374 at 508. For example, if the exhaust temperature is greater than the second predetermined temperature, then exhaust controller 356 may adjust draft intake valve 374 towards fully open to admit more cool draft air into the exhaust gas flow. Conversely, if the exhaust temperature is less than the first predetermined temperature, then exhaust controller 356 may adjust draft intake valve 374 towards fully closed to admit less cool draft air into the exhaust gas flow. In some embodiments, exhaust controller 356 may adjust the position of draft intake valve 374 according to a PID control scheme.

At 512, exhaust controller 356 may determine whether the position of draft intake valve 374 matches the position set at 508, and if not, then iterates until a match is obtained, or the maximum allowable iterations is exceeded at 516 which leads to recording an error and optionally opening flow restriction valve 352 and draft intake valve 374 at 520 (analogously to steps 416, 420, and 424 described above). Once exhaust controller 356 determines that the position of draft intake valve 374 matches the position set at 508, then the method repeats from step 492.

If exhaust controller 356 determines at 496 that the exhaust gas temperature measured at 492 is less than the first predetermined exhaust gas temperature, then exhaust controller 356 may fully open draft intake valve 374 at 500 to help prevent backflow from the chimney through the oven. Instead, backflow from the chimney may flow preferentially out through draft intake valve 374.

Method 480 may proceed to step 524 after either opening draft intake valve 374 at 500, or determining at 504 that the exhaust gas temperature is within the predetermined threshold of the second predetermined temperature. At 524, exhaust controller 356 may measure a pressure differential (e.g. across the oven) to calculate an exhaust gas mass flow rate, substantially as described above with respect to step 444, then proceed to 528.

In steps 528 to 550, exhaust controller 356 may adjust the exhaust gas mass flow rate substantially as described above with respect to steps 448-470.

Figure 13:
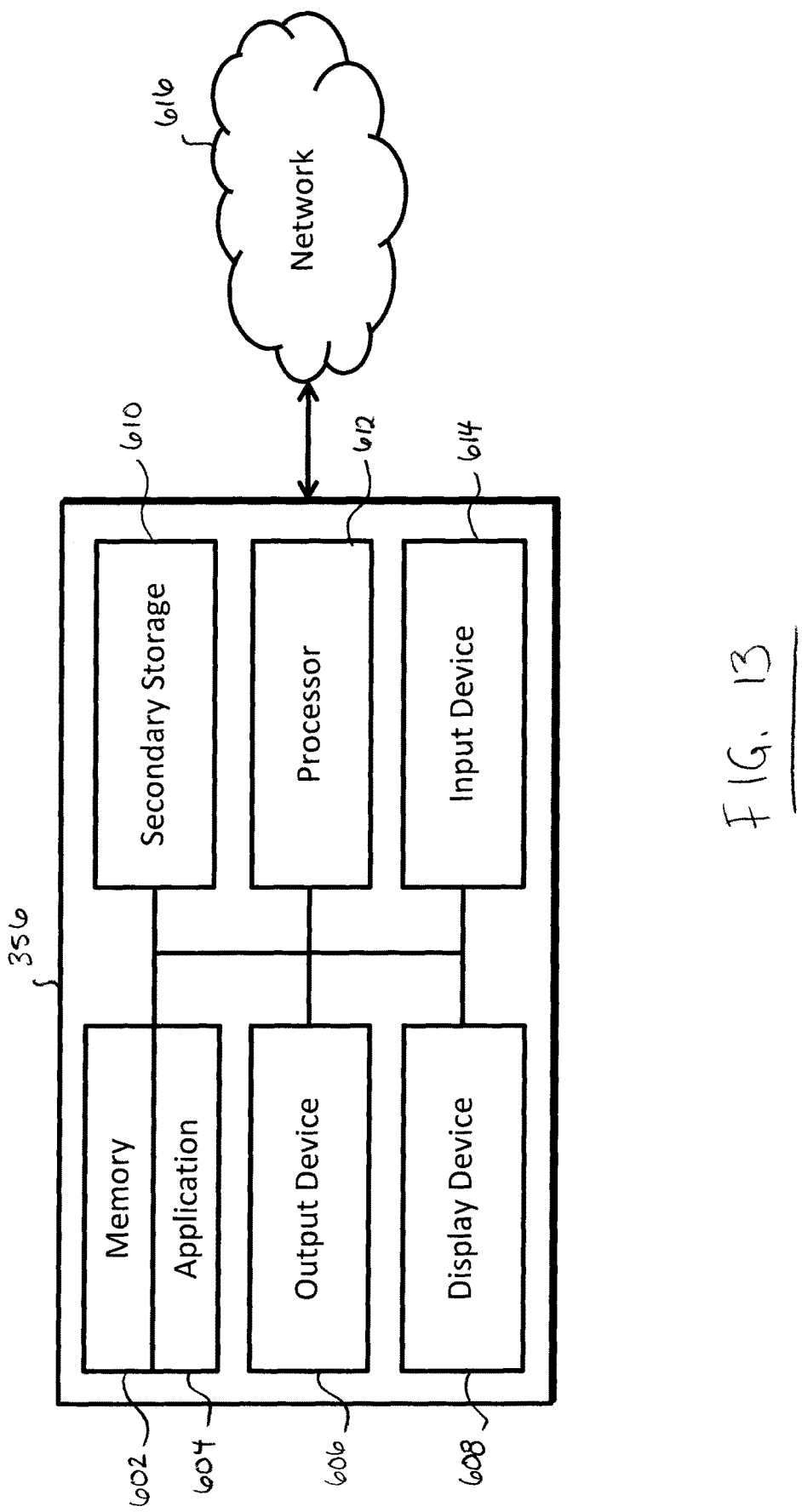
FIG. 13 is a schematic illustration of an exhaust controller, in accordance with another embodiment.

Exhaust controller 356 may be any suitable device for taking pressure and temperature measurements, and adjusting the position of valves as described. FIG. 13 shows a schematic of controller 356 in accordance with at least one embodiment. Generally, controller 356 can be a server computer, desktop computer, notebook computer, tablet, PDA, smartphone, integrated board, or another computing device. In at least one embodiment, controller 356 includes a connection with a network 616 such as a wired or wireless connection to the Internet or to a private network. In some cases, network 616 includes other types of computer or telecommunication networks.

In the example shown, controller 356 includes a memory 602, an application 604, an output device 606, a display device 608, a secondary storage device 610, a processor 612, and an input device 614. In some embodiments, controller 356 includes multiple of any one or more of memory 602, application 604, output device 606, display device 608, secondary storage device 610, processor 612, and input device 614. In some embodiments, controller 356 does not include one or more of applications 604, second storage devices 610, network connections, input devices 614, output devices 606, and display devices 608.

Memory 602 can include random access memory (RAM) or similar types of memory. Also, in some embodiments, memory 602 stores one or more applications 604 for execution by processor 612. Applications 604 correspond with software modules including computer executable instructions to perform processing for the functions and methods described below. Secondary storage device 610 can include a hard disk drive, floppy disk drive, CD drive, DVD drive, Blu-ray drive, solid state drive, flash memory or other types of non-volatile data storage.

In some embodiments, controller 356 stores information in a remote storage device, such as cloud storage, accessible across a network, such as network 616 or another network. In some embodiments, controller 356 stores information distributed across multiple storage devices, such as memory 602 and secondary storage device 610 (i.e. each of the multiple storage devices stores a portion of the information and collectively the multiple storage devices store all of the information). Accordingly, storing data on a storage device or memory as used herein and in the claims, means storing that data in a local storage device, storing that data in a remote storage device, or storing that data distributed across multiple storage devices, each of which can be local or remote.

Generally, processor 612 can execute applications, computer readable instructions or programs. The applications, computer readable instructions or programs can be stored in memory 602 or in secondary storage 610, or can be received from remote storage accessible through network 616, for example. When executed, the applications, computer readable instructions or programs can configure the processor 612 (or multiple processors 612, collectively) to perform the acts described herein (e.g. method 380 or method 480).

Input device 614 can include any device for entering information into controller 356. For example, input device 614 can be a keyboard, key pad, cursor-control device, touch-screen, camera, microphone, or a sensor. Input device 614 can also include input ports and wireless radios (e.g. Bluetooth®, or 802.11x) for making wired and wireless connections to external devices (e.g. sensors 360, 362, 364, 368, 370, and 372).

Display device 608 can include any type of device for presenting visual information. For example, display device 608 can be a computer monitor, a flat-screen display, a projector or a display panel.

Output device 606 can include any type of device for presenting a hard copy of information, such as a printer for example. Output device 606 can also include other types of output devices such as speakers, for example. In at least one embodiment, output device 606 includes one or more of output ports and wireless radios (e.g. Bluetooth®, or 802.11x) for making wired and wireless connections to external devices (e.g. valves 352, 366, and 374).

FIG. 13 illustrates one example hardware schematic of a controller 356. In alternative embodiments, controller 356 contains fewer, additional or different components. In addition, although aspects of an implementation of controller 356 are described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

What is claimed:

1. An exhaust heat recovery system, comprising:
a fluid coolant flow path;
a plurality of heat recovery modules positionable in a flow path of exhaust gases,
   each heat recovery module having a heat exchanger,
   the heat exchanger having a heat exchanger hot side, and a heat exchanger cold side,
   the heat exchanger hot side having spaced apart fins extending axially from a base, and
   the heat exchanger cold side including a fluid coolant track extending between a fluid inlet and a fluid outlet, the fluid coolant track positioned in the fluid coolant flow path,
wherein each of the heat recovery modules is oriented in opposition to another of the heat recovery modules such that the fins of each of the heat recovery modules extend axially towards another of the heat recovery modules, and a plurality of the fins of each of the heat recovery modules aligns with spaces between the fins of another of the heat recovery modules.

2. The exhaust heat recovery system of claim 1, wherein:
the fins of each of the heat recovery modules axially overlap the fins of another of the heat recovery modules.

3. The exhaust heat recovery system of claim 2, wherein:
the fins of each of the heat recovery modules are spaced apart from the fins of each of the other heat recovery modules.

4. The exhaust heat recovery system of claim 1, wherein:
a plurality of the fins of each of the heat recovery modules extends into the spaces between the fins of another of the heat recovery modules.

5. The exhaust heat recovery system of claim 4, wherein:
the fins of each of the heat recovery modules are parallel to the fins of each other of the heat recovery modules.

6. The exhaust heat recovery system of claim 1, wherein:
the fins of each of the heat recovery modules are plain fins.

7. The exhaust heat recovery system of claim 1, wherein:
each fluid coolant track includes an upstream portion, a downstream portion, and a plurality of cross-apertures fluidly connecting the upstream portion to the downstream portion.

8. The exhaust heat recovery system of claim 1, wherein:
the plurality of heat recovery modules includes one or more rows of:
   two or more of the heat recovery modules connected side-by-side in opposition to another two or more of the heat recovery modules that are also connected side-by-side.

9. The exhaust heat recovery system of claim 8, wherein:
the one or more rows comprises at least a first row connected to a second row, the second row positioned downstream of the first row with respect to the flow path of appliance exhaust gases.

10. The exhaust heat recovery system of claim 1, wherein:
the fluid coolant tracks the heat recovery modules are fluidly connected in series.

11. The exhaust heat recovery system of claim 1, wherein:
the fluid coolant tracks the heat recovery modules are fluidly connected in parallel.

12. The exhaust heat recovery system of claim 1, wherein:
each of the heat recovery modules is substantially identical to each other of the heat recovery modules.

13. The exhaust heat recovery system of claim 1, wherein:
each of the heat recovery modules is removably connected to at least one other of the heat recovery modules.

14. The exhaust heat recovery system of claim 1, wherein:
the fluid coolant flow path extends through one or more heat loads.

15. The exhaust heat recovery system of claim 14, wherein:
the one or more heat loads includes one or more thermal storage tanks.

16. The exhaust heat recovery system of claim 14, wherein:
the one or more heat loads includes an appliance intake gas pre-heater.

17. The exhaust heat recovery system of claim 16, wherein:
the appliance intake gas pre-heater includes one or more fluid conduits positioned downstream of the fluid coolant tracks of the plurality of heat recovery modules.

18. The exhaust heat recovery system of claim 17, wherein:
the appliance intake gas pre-heater comprises a plurality of fins thermally coupled to the one or more fluid conduits.

19. The exhaust heat recovery system of claim 14, further comprising:
a pump positioned to pump coolant through the fluid coolant flow path.

20. The exhaust heat recovery system of claim 14, further comprising:
a temperature sensor positioned to detect a temperature of coolant in the fluid coolant flow path;
a heat rejection device operable to remove heat from coolant in the fluid coolant flow path; and
a controller communicatively coupled to the temperature sensor and the heat rejection device, wherein the controller is configured to activate the heat rejection device in response to determining that a temperature of the coolant exceeds a predetermined temperature.

* * * * *